United States Patent [19]
Miyamoto

[11] Patent Number: 5,964,308
[45] Date of Patent: Oct. 12, 1999

[54] TURN ASSISTING MECHANISM FOR A VEHICLE

[75] Inventor: Yasuhiko Miyamoto, Oomiya, Japan

[73] Assignee: Fuji Jokogyo Kabsubshiki Kaisha, Tokyo, Japan

[21] Appl. No.: 08/749,280

[22] Filed: Nov. 13, 1996

[30] Foreign Application Priority Data

Nov. 16, 1995 [JP] Japan .................................... 7-298655

[51] Int. Cl.$^6$ ................................................. B62D 51/06
[52] U.S. Cl. ............................... 180/8.3; 180/209; 280/98
[58] Field of Search .................................. 280/98, 763.1, 280/766.1, 87.051; 180/8.1, 8.2, 8.3, 8.4, 8.5, 8.6, 209; 188/5

[56] References Cited

U.S. PATENT DOCUMENTS

| | | | |
|---|---|---|---|
| 3,335,810 | 8/1967 | McColl | 180/8.1 |
| 5,409,437 | 4/1995 | Lauro et al. | 280/87.051 X |
| 5,526,890 | 6/1996 | Kadowaki | 180/8.3 |

*Primary Examiner*—Robert J. Oberleitner
*Assistant Examiner*—Andrew J. Fischer
*Attorney, Agent, or Firm*—Smith, Gambrell & Russell; Beveridge, DeGrandi,Weilacher & Young Intellectual Property Group

[57] ABSTRACT

A turn assisting mechanism assists a turning motion of a vehicle, such as a lawn mowing vehicle, so that the vehicle may not damage the ground (lawn grass, crops, etc.) when the vehicle makes a U-turn. The turn assisting mechanism is disposed near a wheel of the vehicle nearest to the center of turning of the vehicle about which the vehicle makes a U-turn. The turn assisting mechanism stretches out the rod of a hydraulic cylinder actuator to set a ground contact unit on the ground and lifts up the wheel nearest to the center of turning of the vehicle. When the vehicle makes a U-turn, the hydraulic cylinder actuator sets the ground contact unit on the ground so that the axis of turning of the ground contact unit passes the center of turning of the vehicle, and lifts up the corresponding wheel from the ground. The vehicle makes a U-turn on the ground contact unit without damaging the ground.

8 Claims, 6 Drawing Sheets

TURN ASSISTING MECHANISM FOR A VEHICLE

BACKGROUND OF THE INVENTION

1. Field of the Invention

The present invention relates to a turn assisting mechanism for a vehicle such as a lawn mowing vehicle, an agricultural tractor, etc., and, more specifically, to a turn assisting mechanism capable of lifting up front wheels of a lawn mowing vehicle that travels on lawn in a golf course to mow the lawn from the ground so that a wheel nearest to an axis of turning may not slide on the lawn to damage the same when the lawn mowing vehicle makes a U-turn.

2. Description of the Related Art

Recently proposed autonomous lawn mowing vehicle is capable of carrying out an unmanned mowing operation on lawns in holes of a golf course. The unmanned mowing operation must be carried out in such a way that strips of a fixed width of zones mowed against the lie of lawns and those of zones mowed for the lie of lawns are alternately arranged at accurate intervals. Moreover, the lawn mowing vehicle must be not only capable of making a U-turn along a turning circle of the smallest possible radius but also capable of quickly moving to the next strip for mowing.

An automatic lawn mowing vehicle disclosed in JP-A No. 1-108909 is provided with a four-wheel steering mechanism that turns the front and the rear wheels of the automatic lawn mowing vehicle in opposite directions, respectively, to enable the automatic lawn mowing vehicle to turn along a turning circle of the least possible turning radius.

The smaller the radius of a turning circle along which the lawn mowing vehicle turns around, the closer is the wheels of the lawn mowing vehicle to the center of the turning circle. Therefore, the difference in surface speed increases between a portion of each wheel farther from the center of the turning circle and a portion of the same nearer to the center of the turning circle as the radius of the turning circle decreases. Consequently, the degree of slip of the tread relative to the lawns increases and damage is caused to the lawn when the lawn mowing vehicle makes a U-turn on the lawn along a turning circle of a reduced radius.

Portions of the lawn damaged by the wheels when the lawn mowing vehicle makes a U-turn come to have a brown color in a few days, spoiling the appearance of the lawns. Particularly, in a hole where the lawn mowing vehicle repeats a U-turn to traverse for mowing, the portion of the lawn where the lawn mowing vehicle made a U-turn become brown and give the lawn a poor appearance.

SUMMARY OF THE INVENTION

Accordingly, it is an object of the present invention to provide a turn assisting mechanism that enables a vehicle to make a turn along a turning circle of the least possible radius without damaging lawns.

According to the present invention, a turn assisting mechanism for a vehicle comprises support means attached to a portion of the vehicle supporting a wheel nearest to a center of turning, ground contact means supported under the support means for movement toward and away from a ground surface and for contact with the ground surface, and lifting means interposed between the support means and the ground contact means to move the ground contact means toward and away from the ground surface.

The ground contact means is set on the ground surface so that its axis passes the center of turning about which the vehicle makes a turn. Control means operates the lifting means so that it sets the ground contact means on the ground and then lifts up the support means relative to the ground contact means so that the wheel is separated from the ground surface.

The turn assisting mechanism for a vehicle, in accordance with the present invention lifts up the wheel nearest to the turning axis from the ground surface when the vehicle makes a turn. Consequently, the tread of the wheel does not slide on the ground when the vehicle makes a turn and hence the ground is not damaged by the wheel.

Accordingly, the portion of the ground where the vehicle made a turn is not damaged even if the vehicle repeats a turn to traverse the ground and hence the ground can be maintained in a satisfactory appearance.

A preferred embodiment of the present invention will become understood from the following detailed description referring to the accompanying drawings.

DESCRIPTION OF THE PREFERRED EMBODIMENTS

A chassis 2 of a lawn mowing vehicle incorporating a turn assisting mechanism according to the present invention will be described prior to the description of the turn assisting mechanism.

Figure 1:
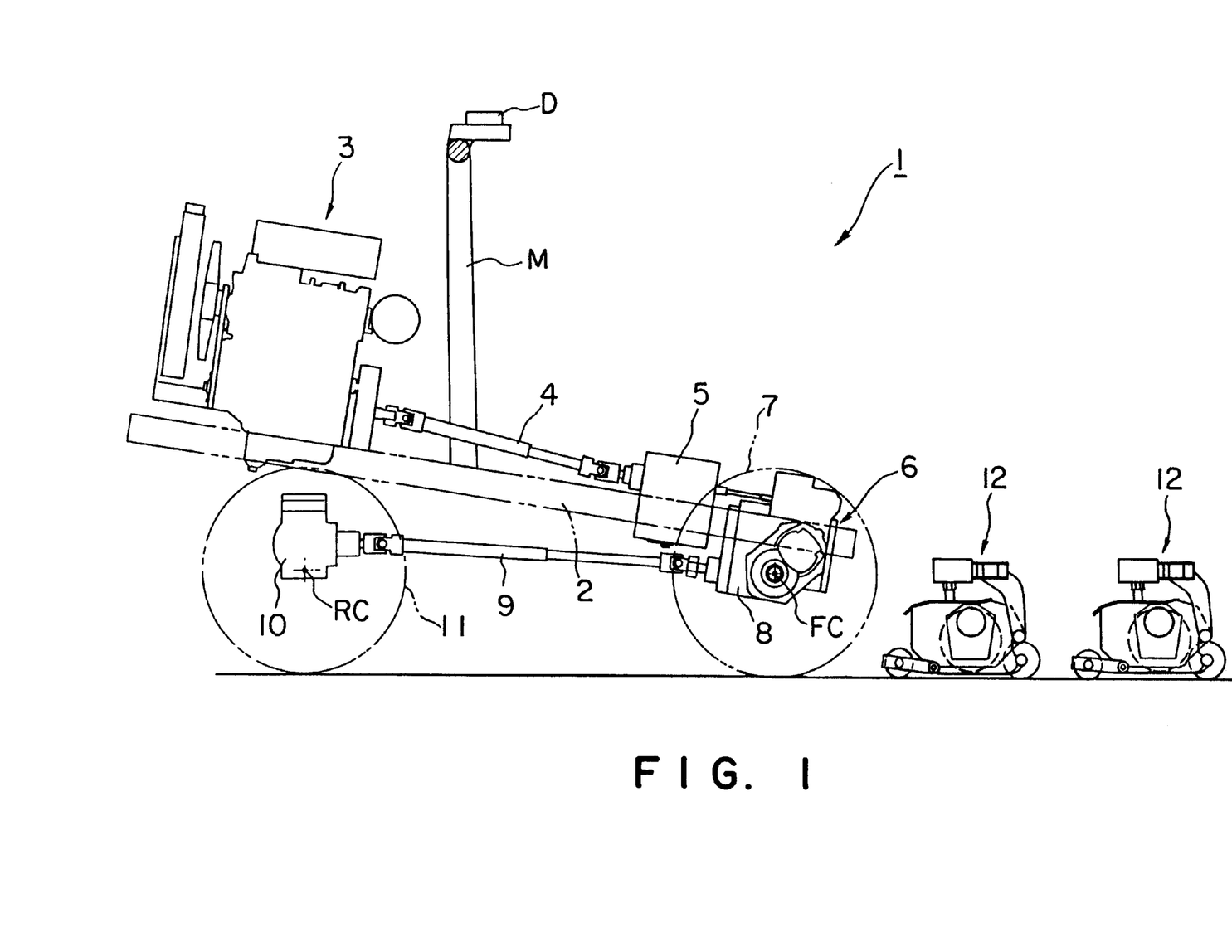
FIG. 1 is a side view of a chassis included in a lawn mowing vehicle incorporating a turn assisting mechanism in a preferred embodiment of the present invention.

A lawn mowing vehicle 1 shown in FIG. 1 is of an autonomous traveling type intended for mowing lawns in a golf course, and capable of performing an automatic, unmanned operation to mow lawn of holes of the golf course by utilizing, in combination, a GPS (global positioning system) using an earth magnetism sensor, a position recognition system using an encoder or the like for counting the number of turns of a wheel, a tracer control system using a new-mown zone sensor, and a path selecting system using a traveling program.

A driving force generated by an engine 3 mounted on a rear portion of the chassis 2 is transmitted through a first propeller shaft 4 and a hydro-static transmission 5 for changing output speed to a differential gear built in a front axle case 6 to drive right and left front wheels 7. The driving force is transmitted also to a gear unit 8 combined with the front axle case 6, and transmitted through a rear output shaft of the gear unit 8 and a second propeller shaft 9 to a differential gear built in a rear axle case 10 to drive right and left rear wheels 11. The lawn mowing vehicle 1 is of a four-wheel drive type in which the pair of front wheels 7 and the pair of rear wheels 11 are driven by the engine 3 for traveling. Lawn mowing machines 12 are suspended from a front portion of the chassis 2 by a suspension mechanism, not shown.

Figure 2:
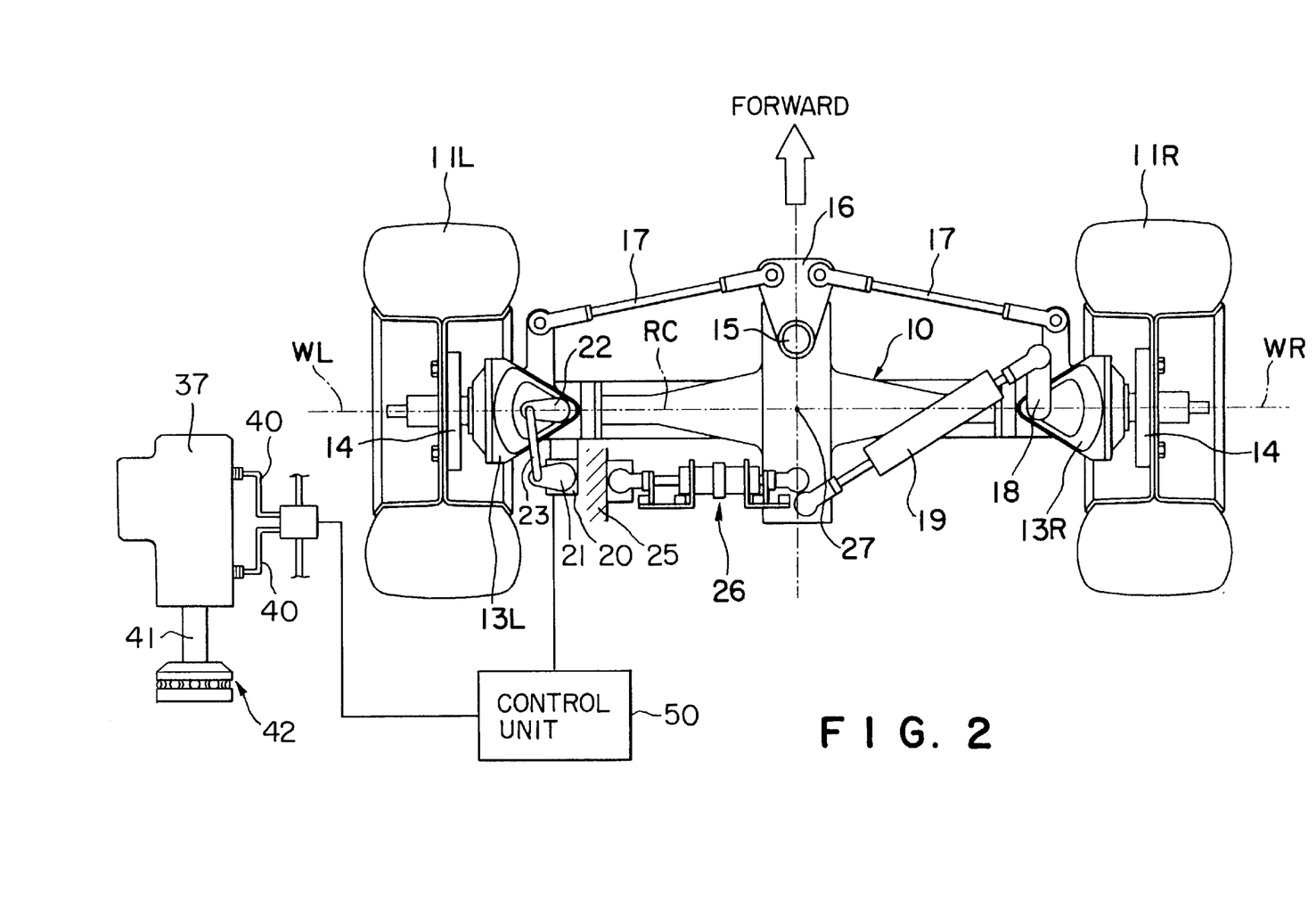
FIG. 2 is a plan view of a rear axle case shown in FIG. 1.

As shown in FIG. 2, a right bevel knuckle 13R and a left bevel knuckle 13L are supported for swing motion on king pins at the opposite side ends of the rear axle case 10, respectively. Rear wheels 11R and 11L are attached to right and left hubs 14 which are driven by driving gear mechanisms built in the bevel knuckles 13R and 13L, respectively.

A control plate 16 is supported on a vertical shaft 15 mounted on the front end of the rear axle case 10 for transverse turning in a horizontal plane. The inner ends of a pair of tie rods 17 are joined to the front end of the control plate 16 and the outer ends of the same are joined to the bevel knuckle 13R and 13L, respectively, to form an Ackermann steering gear.

A rear wheel steering hydraulic cylinder actuator 19 is extended between the rear end of the rear axle case 10 and an arm 18 fixed to an upper part of the right bevel knuckle 13R. The right wheel 11R and the left wheel 11L are turned to the right relative to the rear axle case 10 when the rear wheel steering hydraulic cylinder actuator 19 is expanded, and the same are turned to the left when the rear wheel steering hydraulic cylinder actuator 19 is contracted.

Since the rear wheels 11R and 11L are steering wheels, the lawn mowing vehicle 1 makes a left-hand turn when the rear wheels 11R and 11L are turned to the right, and makes a right-hand turn when the rear wheels 11R and 11L are turned to the left.

Figure 3:
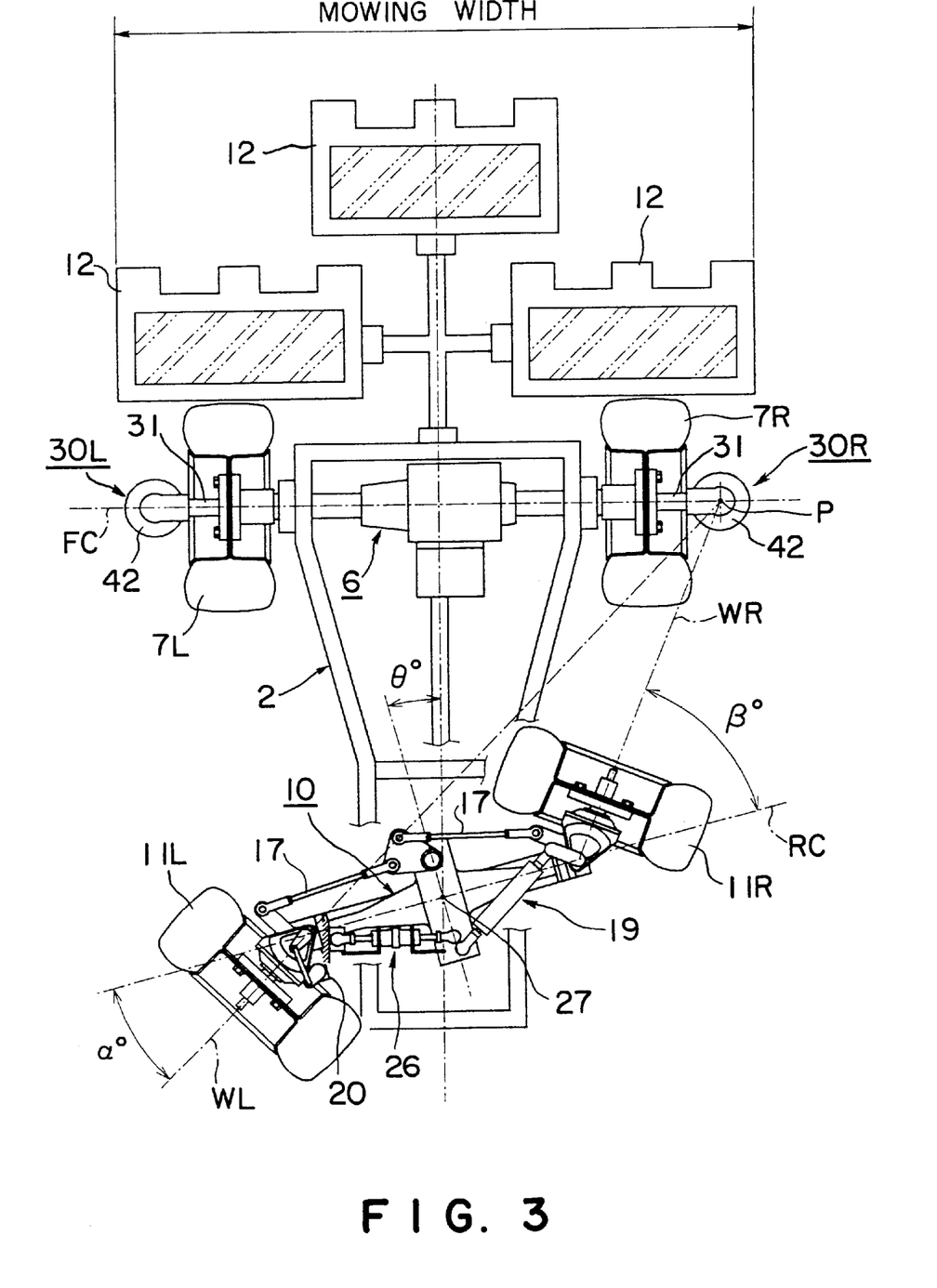
FIG. 3 is a plan view of the lawn mowing vehicle of FIG. 1 when making a right-hand U-turn.

A rocking lever 21 that actuates a steering angle sensor 20 attached to the left end of the rear axle case 10, and a lever fixed to an upper part of the left bevel knuckle 13L are linked together with a rod 23. As shown in FIG. 3, a relative steering angle of the left rear wheel 11L relative to the rear axle case 10, i.e., an angle $\alpha°$ between the longitudinal axis RC of the rear axle case 10 and the axis WL of rotation of the left rear wheel 11L, is detected by the steering angle sensor 20.

As shown in FIG. 2, a hydraulic cylinder actuator 26 for turning the rear axle case 10 is extended between a rear end part of the rear axle case 10 and a bracket 25 fixed to the chassis 2. The rear axle case 10 is turned in steering directions about a vertical pivot axis 27 by extending and contracting the hydraulic cylinder actuator 26.

When causing the lawn mowing vehicle 1 to make a right-hand U-turn, the hydraulic cylinder actuator 26 is fully extended to turn the rear axle case 10 about the pivot axis 27 through an angle $\theta°$ as shown in FIG. 3. Subsequently, the hydraulic cylinder actuator 19 for rear wheel steering is contracted to turn the left rear wheel 11L through a relative steering angle $\alpha°$ and the right rear wheel 11R through a relative steering angle $\beta°$ by the agency of the Ackermann steering mechanism including the control plate 16 and the pair of tie rods 17. Consequently, the rear wheels 11R and 11L are turned fully to the left. In this state, the axis WL of rotation of the left rear wheel 11L and the axis WR of rotation of the right rear wheel 11R meet each other at a point P on the common axis FC of rotation of the pair of front wheels 7R and 7L as shown in FIG. 3. Therefore, the lawn mowing vehicle 1 makes a right-hand U-turn about the point P.

The turn assisting mechanism of the present invention will be described hereinafter. As shown in FIG. 3, the lawn mowing vehicle 1 is provided with a right turn assisting mechanism 30R and a left turn assisting mechanism 30L. The turn assisting mechanisms 30R and 30L are identical to each other except that they are reversed to each other and hence only the left turn assisting mechanism 30L will be described with reference to FIG. 4.

Figure 4:
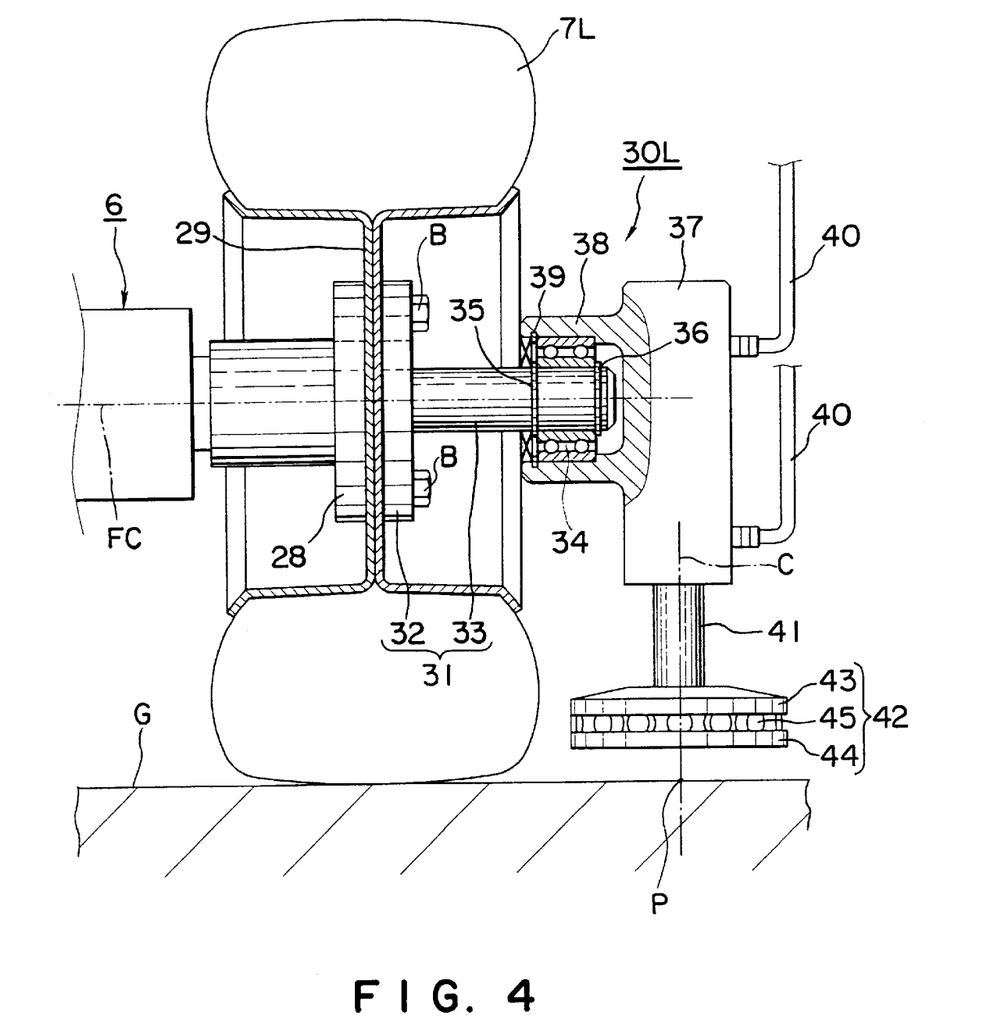
FIG. 4 is a partly sectional front view of an essential portion of the turn assisting mechanism of the present invention.

Referring to FIG. 4, a support structure 31 has a disk-shaped base 32 firmly fastened with a plurality of bolts B to a hub 28 holding the left front wheel 7L so as to hold a wheel 29 between the hub 28 and the base 32. The support structure 31 further has a cylindrical support shaft 33 projecting from the outer end surface of the base 32 coaxially with the axis FC of rotation of the left front wheel 7L. A bearing 34 is mounted on the outer end portion of the support shaft 33 and is restrained from axial movement on the support shaft 33 by a pair of snap rings 35 and 36 put on the support shaft 33 on the opposite sides of the bearing 34, respectively.

A cylindrical bearing housing 38 is formed integrally with the cylinder portion of a hydraulic cylinder actuator 37 included in the turn assisting mechanism 30L. The bearing housing 38 is put on the support shaft 33 so as to receive the bearing 34 therein and retained in place with a snap ring 39. Thus, the hydraulic cylinder actuator 37 is mounted on the support shaft 33 so as to be able to turn about the axis FC of rotation relative to the support shaft 33. A pair of hydraulic lines 40 are connected to the hydraulic cylinder actuator 37 to supply a hydraulic fluid to the hydraulic cylinder actuator 37 from a hydraulic fluid source, which supplies the hydraulic fluid also to the hydraulic cylinder actuator 19 for rear wheel steering and to the hydraulic cylinder actuator 26 for turning the rear axle case. A rod 41 included in the hydraulic cylinder actuator 37 extends perpendicularly to the axis FC of rotation. Supply of the hydraulic fluid through the hydraulic lines 40 to the hydraulic cylinder actuator 37 is controlled to stretch out and retract the rod 41.

A ground contact unit 42 included in the turn assisting mechanism is attached to the extremity of the rod 41. The ground contact unit 42 includes a fixed disk 43 attached to the extremity of the rod 41, a footpad 44 pivotally supported on the fixed disk 43, and rollers 45 retained between the fixed disk 43 and the footpad 44. The rollers 45 enables the fixed disk 43 to rotate smoothly under load relative to the footpad 44 when the footpad 44 is pressed against the ground. The diameter of the footpad 44 is determined so that load applied to the footpad 44 through the fixed disk 43 is distributed not to damage lawns.

Figure 5:
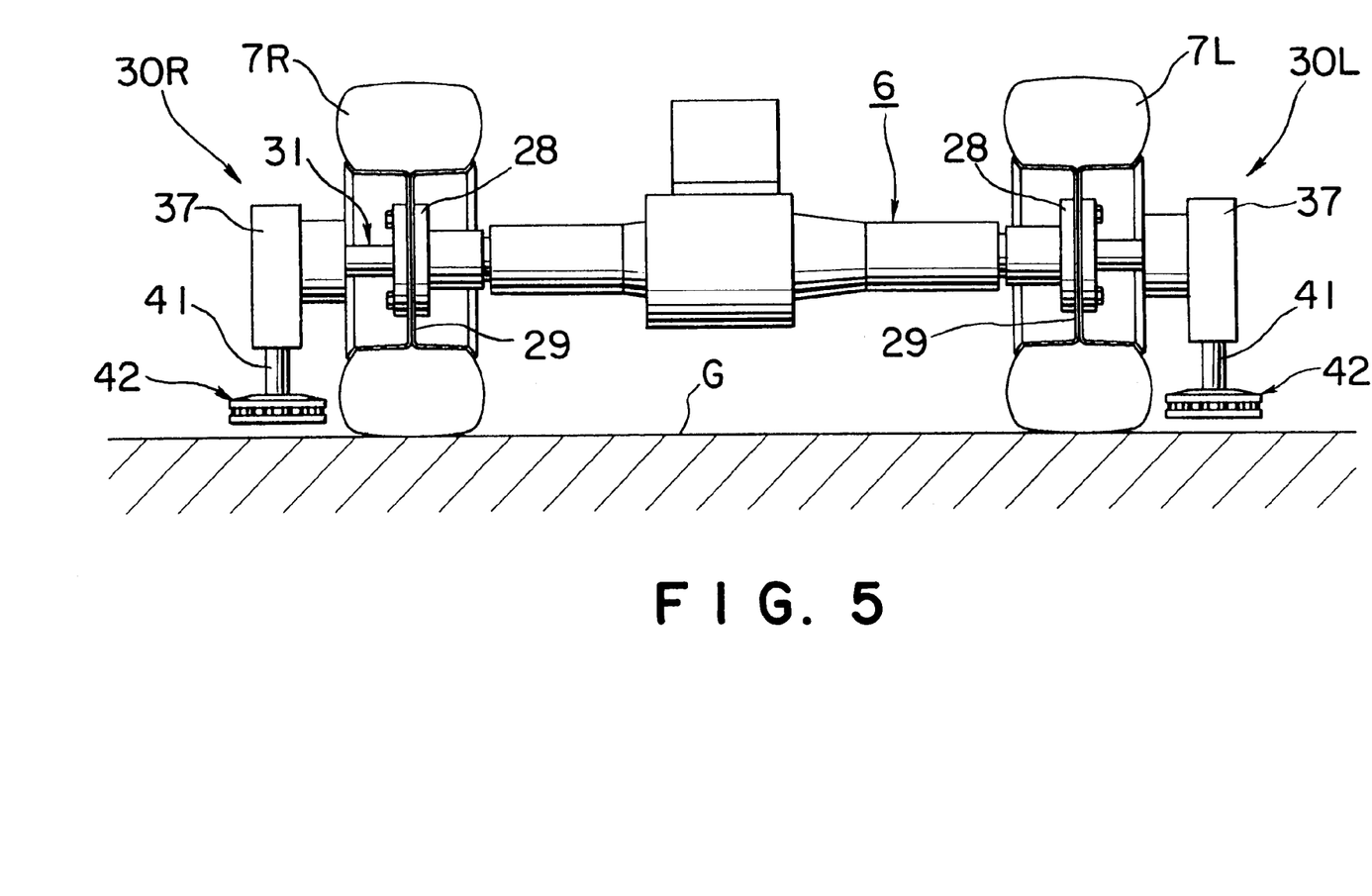
FIG. 5 is a front view of a front axle case combined with the turn assisting mechanism of FIG. 4.

The operation of the turn assisting mechanism 30 will be described below. Referring to FIG. 4, the hydraulic cylinder actuator 37 is supported by the bearing 34 on the outer end portion of the support shaft 33. Therefore, the hydraulic cylinder actuator 37 does not rotate together with the support shaft 33 when the front wheel 7L rotates as the lawn mowing vehicle travels. The rod 41 of the hydraulic cylinder actuator 37 is directed always toward the ground surface G by the weight of the ground contact unit 42. Therefore, the ground contact unit 42 is suspended by the rod 41 of the hydraulic cylinder actuator 37 opposite to the ground surface G as shown in FIG. 5.

Suppose that the lawn mowing vehicle 1 makes a right-hand U-turn. First, the hydraulic cylinder actuator 26 is fully extended to turn the rear axle case 10 to the left with respect to the traveling direction of the lawn mowing vehicle 1 through an angle $\theta°$, and then the hydraulic cylinder actuator 19 is fully contracted to turn the rear wheels 11L and 11R through relative steering angles $\alpha°$ and $\beta°$, respectively, as shown in FIG. 3. Upon the detection of the approach of the relative steering angle of the left rear wheel 11L to $\alpha°$ by the steering angle sensor 20, a control unit 50 (FIG. 2) actuates the hydraulic cylinder actuator 37 of the right turn assisting mechanism 30R disposed near the right front wheel 7R to stretch out the rod 41 so that the footpad 44 of the ground contact unit 42 is set on the ground surface G. In this state, the axis of rotation of the fixed disk 43 and the footpad 44 relative to each other coincides with the center P of turning of the lawn mowing vehicle 1.

Figure 6:
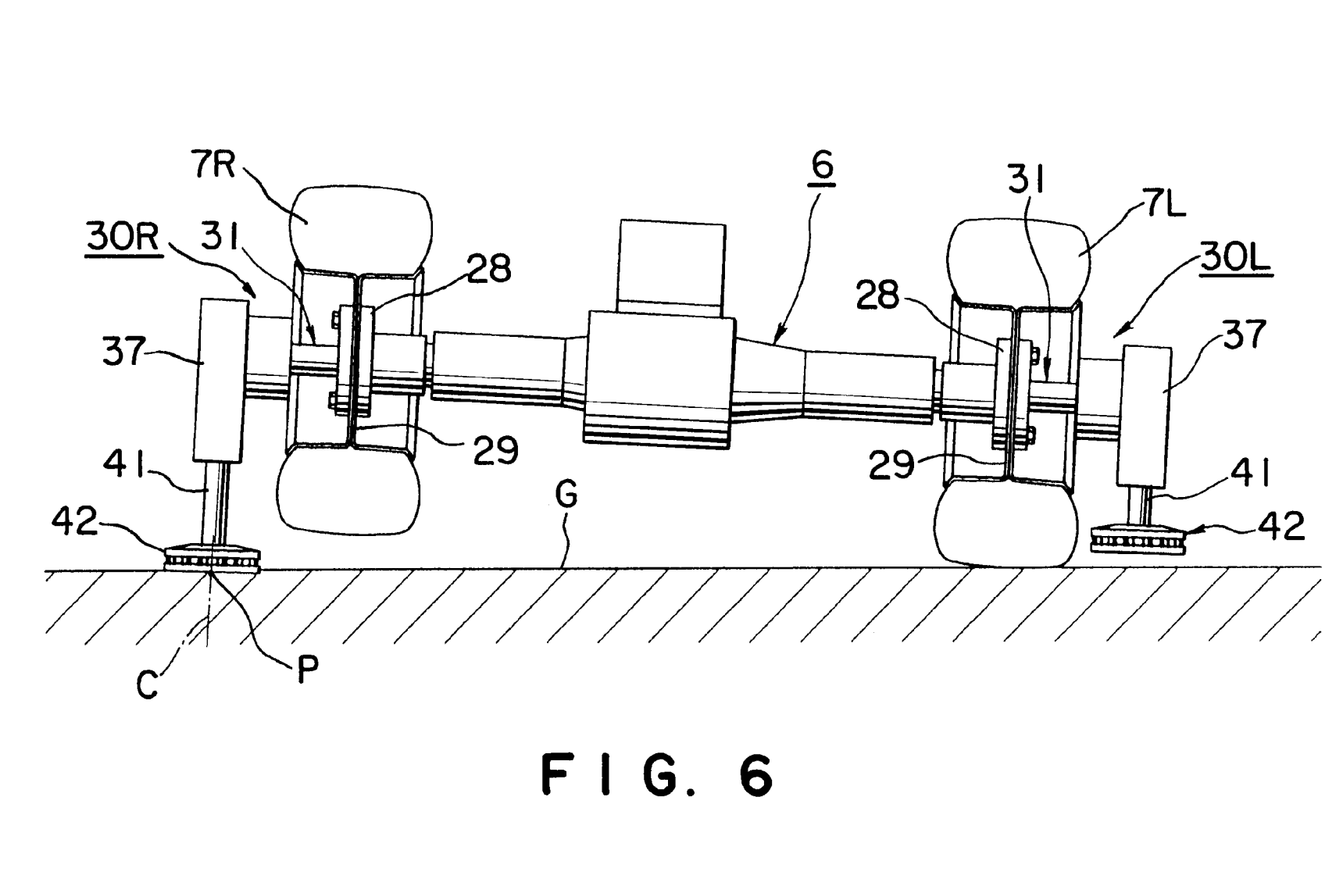
FIG. 6 is a front view of the front axle case, explaining the operation of the turn assisting mechanism of FIG. 4.

The rod 41 of the hydraulic cylinder actuator 37 is further stretched out by the control unit 50 after the ground contact unit 42 has been set on the ground surface G to raise the front axle case 6 by the support structure 31 of the right turn assisting mechanism 30R, so that the right front wheel 7R of the lawn mowing vehicle 1 is lifted up from the ground surface G and the front axle case 6 is tilted relative to the ground surface G as shown in FIG. 6. However, since the front axle case 6 is supported on the chassis 2 so as to roll relative to the chassis 2, the chassis 2 of the lawn mowing vehicle 1 remains in a horizontal position even if the front axle case 6 is tilted. When the differential gear built in the front axle case 6 is provided with a differential limiting device, the disconnection of the left front wheel 7L bearing on the ground from the driving force can be prevented.

The lawn mowing vehicle 1 makes a right-hand U-turn about the center P of turning, i.e., about the axis C of turning of the ground contact unit 42, by the traction of the left front wheel 7L bearing on the ground surface G and the rear wheels 11R and 11L. Although substantially the same load as the axle load that may be exerted on the right front wheel 7R is exerted on the ground contact unit 42, the fixed disk 43 is able to turn smoothly relative to the footpad 44 because the plurality of rollers 45 are retained between the fixed disk 43 and the footpad 44. Accordingly, the lawn mowing vehicle 1 is able to make a smooth right-hand U-turn about the center P of turning similar to that when the right front wheel 7R is bearing on the ground. Since the right front wheel 7R nearest to the center P of turning is separated from the ground surface G while the lawn mowing vehicle 1 is in the right-hand U-turn, the lawn is not damaged by the right front wheel 7R which otherwise would slip on the lawn to damage the latter.

Upon the detection of completion of the right-hand U-turn of the lawn mowing vehicle 1 by a magnetic direction finder D (FIG. 1) placed on top of a mast M set on the lawn mowing vehicle 1, the rod 41 of the hydraulic cylinder actuator 37 is retracted to lower the right front wheel 7R onto the ground surface G, and then the rod 41 is further retracted to separate the ground contact unit 42 from the ground surface G.

The turn assisting mechanism 30 in this embodiment lifts up the wheel nearest to the center P of turning from the ground surface G when the lawn mowing vehicle makes a U-turn, the tread of the wheel nearest to the center P of turning, which slips on the lawn, does not damage the lawn.

Since the rollers 45 are retained between the fixed disk 43 attached to the lower end of the rod 41 of the hydraulic cylinder actuator 37 and the footpad 44 and since the fixed disk 43 and the footpad 44 are able to turn smoothly relative to each other, the ground contact unit 42 will not damage the lawn when the lawn mowing vehicle 1 makes a U-turn.

Since the turn assisting mechanism 30 in this embodiment is mounted on the hub 28 supporting the wheel of the lawn mowing vehicle 1, any modification of the chassis 2 of the lawn mowing vehicle is not necessary for incorporating the turn assisting mechanism 30 into the lawn mowing vehicle 1.

Although a preferred embodiment of the present invention has been described, the present invention is not limited thereto in its practical application and many changes and variations may be made in the embodiment specifically described herein.

For example, although the foregoing embodiment is designed to lift up the nonsteering wheel that is not steered, the steering wheel may be lifted up provided that the steering wheel is nearest to the center of turning.

The ground contact unit may be fixedly mounted on the front axle case instead of attaching the same to the hub which holds the wheel of the lawn mowing vehicle, and the ground contact unit may be formed so as to extend on the outer side of the wheel by clearing the wheel.

A conical member capable of sticking in the ground may be used instead of the ground contact unit having the fixed disk and the footpad in combination.

What is claimed is:

1. A turn assisting mechanism for a vehicle having an engine mounted on a chassis, a first pair of right and left wheels for steering the vehicle, and a second pair of right and left wheels for moving the vehicle, said vehicle having a center of turning about which the vehicle makes a turn, comprising:

support means attached to outside portions of said right and left wheels of the second pair, respectively;

ground contact means supported on and under each of the support means for movement toward and away from a ground surface and for contact with the ground surface, said ground contact means having an axis coinciding with said center of turning when the ground contact means is contacting the ground surface, wherein said ground contact means comprises a foot member for bearing on the ground surface, and a rotary member provided coaxially with the foot member for rotary movement relative to the foot member, said rotary member having an axis of rotation passing said center of turning when the foot member is set on ground surface;

lifting means interposed between the support means and the ground contact means for moving the ground contact means toward and away from the ground surface; and control means for operating said lifting means to set the ground contact means on the ground surface and then to lift up the support means relative to the ground contact means to thereby separate said wheel from the ground surface to prevent damage to the ground surface by said second pair of wheels while the vehicle is making a turn about said center of turning.

2. The turn assisting mechanism according to claim 1, wherein:

said foot member comprises a footpad and said rotary member comprises rollers.

3. A turn assisting mechanism for a vehicle having an engine mounted a chassis, a first pair of right and left wheels for steering vehicle, and a second pair of right and left wheels for moving the vehicle, said vehicle having a center of turning about which the vehicle makes a turn, comprising:

support means attached to outside portions of said right and left wheels of the second pair, respectively;

ground contact means supported on and under each of the support means for movement toward and away from a ground surface and for contact with the ground surface, said ground contact means having an axis coinciding with said center of turning when the ground contact means is contacting the ground surface;

lifting means interposed between the support means and the ground contact means for moving the ground contact means toward and away from the ground surface; and control means for operating said lifting means to set the ground contact means on the ground surface and then to lift up the support means relative to the ground contact means to thereby separate said wheel from the ground surface to prevent damage to the ground surface by said second pair of wheels while the vehicle is making a turn about said center of turning, wherein said support means comprises:

a base secured to said wheel;

a support shaft projecting horizontally from and coaxially with said wheel.

4. The turn assisting mechanism according to claim 3, wherein:

said lifting means is rotatably supported on said support shaft.

5. The turn assisting mechanism according to claim 4, wherein:

said lifting means is a hydraulic actuator having a rod extending downwardly for up and down movement.

6. The turn assisting mechanism according to claim 5, wherein:

said foot member is supported on a lowermost end of said rod.

7. A turn assisting mechanism for a vehicle having an engine mounted on a chassis, a first pair of right and left wheels for steering the vehicle, and a second pair of right and left wheels for moving the vehicle, said vehicle having a center of turning about which the vehicle makes a turn, comprising:

support means attached to outside portions of said right and left wheels of the second pair, respectively;

ground contact means supported on and under each of the support means for movement toward and away from a ground surface and for contact with the ground surface, said ground contact means having an axis coinciding with said center of turning when the ground contact means is contacting the ground surface;

lifting means interposed between the support means and the ground contact means for moving the ground contact means toward and away from the ground surface;

control means for operating said lifting means to set the ground contact means on the ground surface and then to lift up the support means relative to the ground contact means to thereby separate said wheel from the ground surface to prevent damage to the ground surface by said second pair of wheels while the vehicle is making a turn about said center of turning; and a steering angle sensor provided on said vehicle for delivering a signal when a specific steering angle is detected; and wherein said control means is responsive to said signal for operating said lifting means.

8. A method for turning a vehicle comprising turning a vehicle at an acute angle about the center of turning using the turn assisting mechanism defined in claim 3.

* * * * *